United States Patent
Chen et al.

(10) Patent No.: US 11,251,639 B2
(45) Date of Patent: Feb. 15, 2022

(54) ADAPTER POWER ADD-UP FEATURE FOR MULTIPORT SYSTEMS

(71) Applicant: Renesas Electronics America Inc., Milpitas, CA (US)

(72) Inventors: Yen-Mo Chen, Morrisville, NC (US); Sungkeun Lim, Cary, NC (US); Mehul Shah, Cary, NC (US); Eric Solie, Durham, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 48 days.

(21) Appl. No.: 16/906,971

(22) Filed: Jun. 19, 2020

(65) Prior Publication Data

US 2020/0403426 A1    Dec. 24, 2020

Related U.S. Application Data

(60) Provisional application No. 62/865,824, filed on Jun. 24, 2019.

(51) Int. Cl.
*H02J 7/00* (2006.01)

(52) U.S. Cl.
CPC ............ *H02J 7/007* (2013.01); *H02J 7/0045* (2013.01); *H02J 7/0068* (2013.01); *H02J 2207/20* (2020.01)

(58) Field of Classification Search
CPC ........ H02J 7/007; H02J 7/0029; H02J 7/0045; H02J 7/0068; H02J 7/0083; H02J 2207/20
USPC ................................ 320/107, 134, 158, 163
See application file for complete search history.

(56) References Cited

U.S. PATENT DOCUMENTS

| | | | | |
|---|---|---|---|---|
| 2014/0145679 A1* | 5/2014 | Chen | ................... | H02M 3/1582 320/128 |
| 2014/0203763 A1* | 7/2014 | Zhao | ................. | H02J 7/00718 320/107 |
| 2018/0375365 A1* | 12/2018 | Cheng | ................. | H02J 7/00718 |

* cited by examiner

*Primary Examiner* — Edward Tso
*Assistant Examiner* — Aaron Piggush
(74) *Attorney, Agent, or Firm* — Foley & Lardner LLP

(57) ABSTRACT

One or more embodiments are directed to a multiport power delivery architecture that reduces the cost and maximizes the power utilization. According to some aspects, an adapter power add-up feature of the embodiments can combine the power of two or more adapters. The total power can be used to support CPU Turbo events and Quick Charge function. In one aspect, one charger operates as voltage source or current source and the other(s) as current source(s). When the system demand is high enough for all chargers may operate as current sources, the battery will supply the rest of the system demand. The proposed implementation of adapter power add-up feature can enable simple control scheme. Customers can set up BGATE control priorities to determine which charger to handle the BGATE control.

20 Claims, 13 Drawing Sheets

| Case | USB type-C port 1 | | | USB type-C port 2 | | |
|---|---|---|---|---|---|---|
| 1 | N/A | | | N/A | | |
| 2 | ADP1 (5V ~ 20V) | | | N/A | | |
| 3 | | | | ADP2 (5V ~ 20V) | | |
| 4 | ADP1 (5V ~ 20V) | | | ADP2 (5V ~ 20V) | | |
| 5 | ADP1 (5V ~ 20V) | | | | | |
| 6 | OTG1 (5V ~ 20V) | | | ADP2 (5V ~ 20V) | | |
| 7 | OTG device 1 (5V ~ 20V) | | | | | |
| 8 | | | | OTG2 (5V ~ 20V) | | |
| 9 | OTG1 (5V ~ 20V) | | | OTG2 (5V ~ 20V) | | |

| | Implementation Example1 | Implementation Example1 | Implementation Example2 |
|---|---|---|---|
| Brief Description | Charge 20W | Charge 35W | Charge 20W or 35W |
| | Charger2 MaxsysV2 < Desired min. battery voltage (Ex: Charger2 MaxsysV2=6.9V) | Charger2 MaxsysV2 < Charger1 MaxsysV1 (Ex: Charger2 MaxsysV2=8.2V) | Charger2 CC limit (CC2) < Charger1 CC limit (CC1) (Ex: CC2=0.9*CC1) |
| Adapter Power Add-up | CPU Turbo event | Quick Charge event CPU Turbo event | Quick Charge event CPU Turbo event |
| BGATE Control Priority | Required | Required | Optional |
| Charging Power Support | ADP1 only (no need to use ADP2 power) | ADP1+ADP2 (when Charger2 operates in CL) | ADP1+ADP2 (when Charger1 operates in CL) |
| CPU Turbo Mode Support | Power delivery order: ADP1→BAT→ADP2 | Power delivery order: ADP1+ADP2→BAT | Power delivery order: ADP1→ADP2→BAT |

ADAPTER POWER ADD-UP FEATURE FOR MULTIPORT SYSTEMS

CROSS-REFERENCE TO RELATED APPLICATIONS

This application claims priority to and the benefit of U.S. Provisional Application No. 62/865,824, filed Jun. 24, 2019, entitled "IMPLEMENTATION OF ADAPTER POWER ADD-UP FEATURE FOR MULTIPORT SYSTEMS", which is incorporated herein by reference in its entirety for all purposes.

TECHNICAL FIELD

The present embodiments relate generally to consumer, industrial and hand-held computing, and more particularly to a power delivery architecture for such devices having multiport systems.

BACKGROUND

Proliferation of portable electronic devices increases demands for batteries. In one example, portable electronic devices such as handheld devices, smartphones, and tablet computers include batteries that can be charged with power from a power source and supply power for operation after being detached from the power source. To reduce charging time, multiple electronic devices may share power. However, configuring multiple electronic devices for power sharing may involve a complex process.

SUMMARY

One or more embodiments are directed to a multiport power delivery architecture that reduces costs and maximizes power utilization. According to some aspects, an adapter power add-up function or feature of the embodiments can be leveraged to combine the power from two or more adapters. The total combined power can be used to support certain load requirements such as CPU Turbo events and certain battery charging application such as a Quick Charge function. In one aspect, one charger coupled to one adapter or port operates as voltage a source or a current source and the other charger(s) as current source(s). When the system demand is high enough for two or more chargers to operate as current sources, the battery may supply the rest of the system demand. One or more embodiments of an adapter power add-up feature can enable simple control schemes.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 2 is a table illustrating an operating conditions of adapters connected to adapters ports, according to some embodiments.

FIG. 12 is a table showing example operating conditions of the system of FIG. 4, according to some embodiments.

DETAILED DESCRIPTION

Figure 1:
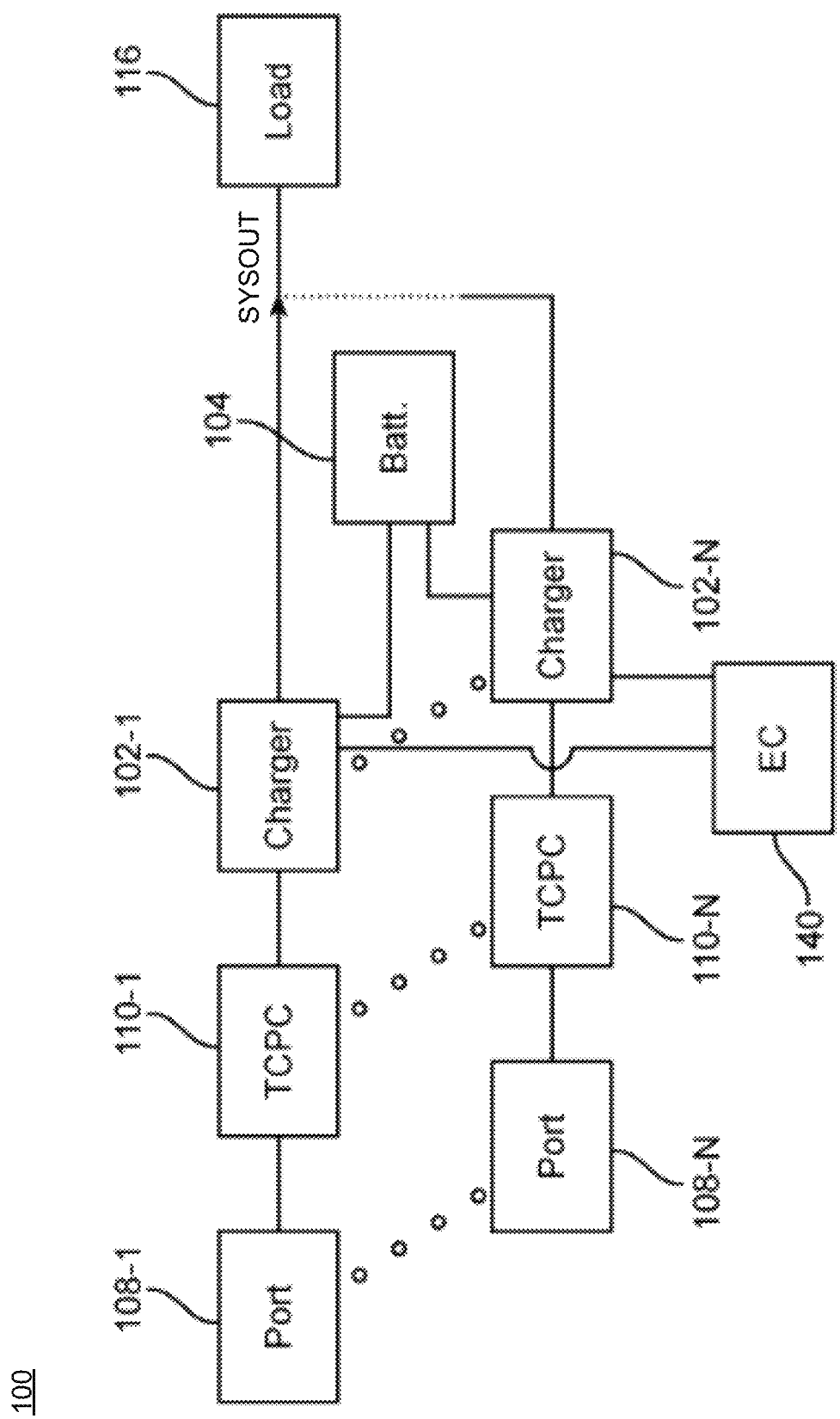
FIG. 1 is a block diagram illustrating aspects of a system in which embodiments may be implemented.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

One or more embodiments are directed to a multiport power delivery system that reduces the cost and maximizes the power utilization. According to some aspects, an adapter power add-up feature disclosed herein can combine power from two or more adapters. The total combined power can be used to support CPU Turbo events in a connected system and a Quick Charge function for one or more batteries in the system.

In some embodiments, a system includes a controller, a first charger, a second charger, and a battery connected to system output port. In one configuration, the first charger is connected between a first adapter port and a system output port, and the second charger is connected between a second adapter port and the system output port. Each charger may be a DC-DC power converter. In one configuration, the battery, a sense resistor and a battery control transistor are connected to the system output port in series. In one configuration, the controller is coupled to the first charger and the second charger. In one aspect, the controller can select or configure the first charger or the second charger to control the battery control transistor. The selected charger may sense a voltage at the system output port or a current through the sense resistor to provide power to the system output port according to the sensed voltage or current. The power at the system output port may be provided to the battery, to a device (e.g., processor) connected to the system output port, or a combination of them. Accordingly, two or more adapters connected to the adapter ports can provide power to the battery and/or a device connected to the system output port in a simple architecture.

In one aspect, configuring two or more chargers of the system to perform an adapter power add-up feature can be challenging. In particular, multiple current paths are connected to the system output port, where a single sense resistor is implemented to sense a current through the battery. However, simultaneously controlling two or more chargers to provide power to the system output port by sensing a current through the single sense resistor may be difficult. Moreover, power demand from the device (e.g., processor) connected to the system output port may be unknown or may change frequently, thereby increasing complexity in configuring or controlling the chargers. Still further, it is often desirable to charge one or more batteries in the system faster than is possible when charging with power from just one adapter connected to the system.

In one aspect, one charger of the present embodiments operates as a voltage source or a current source and the other(s) as current source(s). When the system demand is high enough for all chargers to operate as current sources, the battery may supply the rest of the system demand. The adapter power add-up feature or function of the embodiments can thus enable a simple control scheme.

FIG. 1 is a block diagram illustrating aspects of an example system 100 incorporating the present embodiments. System 100 can be a computing device such as a notebook computer (e.g. MacBook, Ultrabook, etc.), laptop computer, pad or tablet computer (iPad, Surface, etc.), etc., a power bank, a USB-C interface platform, or any system using a battery and capable of receiving power from an adapter. In these and other embodiments, system 100 includes a load 116, such as a CPU running a conventional operating system such as Windows or Apple OS, and can be an x86 processor from Intel, AMD or other manufacturers, as well as other processors made by Freescale, Qualcomm, DSPs, GPUs, etc. It should be apparent that system 100 can include many other components not shown such as solid state and other disk drives, memories, peripherals, displays, user interface components, etc. According to certain aspects, a system 100 in which the present embodiments can find particularly useful application has operational power needs that can exceed the power limits of technologies such as USB-A, for example over 60 watts. However, the present embodiments are not limited to applications in such systems.

As further shown, an example system 100 in which the present embodiments can find useful applications includes two or more ports 108-1 to 108-N. Ports 108 can be Universal Serial Bus (USB) ports, such as a USB Type C (USB-C) port or a USB Power Delivery (USBPD) port in a USB Type C example such as that shown in FIG. 1, each port 108 is coupled to an associated Type C port controller (TCPC) 110 (e.g., TCPC 110-1 to 110-N). Each TCPC 110 includes functionality for detecting the presence and type of device attached to port 108, controlling switches associated with connecting the attached device to other system 100 components, and for communicating port status to an embedded controller (EC) 140 (e.g., via an I2C interface). The EC 140 is generally responsible for managing power configurations of the system 100 (e.g. depending on whether a power adapter is connected or not connected to any of ports 108 as communicated to the EC 140 from TCPCs 110, etc.), receiving battery status from battery 104 (e.g. via a separate or incorporated fuel gauge circuit), and for communicating battery charging and other operational control information to charger 102 (e.g. via SMbus interface), as will become more apparent from the descriptions below.

As shown, system 100 includes battery chargers 102-1 to 102-N for each port 108. In embodiments, chargers 102 can include one or more buck-boost narrow output voltage DC (NVDC) chargers. According to certain general aspects, during operation of system 100, when a power adapter is plugged into any of ports 108, the associated battery charger 102 is configured to charge battery 104. In notebook computer (e.g. Ultrabook) and other embodiments of system 100, battery 104 can be a rechargeable 1S/2S/3S/4S (i.e. 1 cell, 2 cell, 3 cell, or 4 cell stack) Lithium-ion (Li-ion) battery. In some embodiments, the system 100 receives power from one or more adapters connected to respective ports 108, the battery 104 or any combination of them. In one example, the system 100 receives power from the one or more adapters according to attach detection protocol (ADP). In some embodiments, the system 100 provides power from one or more adapters connected to respective ports 108, the battery 104, a device (e.g., processor or an external device) connected to the load 116, or any combination of them. In one example, the system 100 provides power to the one or more ports 108 according to on-the-go (OTG) protocol. Further details of the configuration and the operation of the system 100 are provided below.

FIG. 2 is a table 200 illustrating operation cases for a dual port system according to embodiments. In case 1, no adapter is connected to ports 108-1, 108-2. In case 2, an adapter connected to the first port 108-1 operates according to ADP to provide power to the system output port SYSOUT. In case 3, an adapter connected to the second port 108-2 operates according to ADP to provide power to the system output port SYSOUT. In case 4, both the first adapter connected to the first port 108-1 and the second adapter connected to the second port 108-2 operate according to ADP to provide power to the system output port SYSOUT. In case 5, an adapter connected to the first port 108-1 operates according to ADP to provide power to the system output port SYSOUT, and an OTG device connected to the second port 108-2 operates according to OTG to receive power from the system output port SYSOUT. In case 6, an adapter connected to the second port 108-2 operates according to ADP to provide power to the system output port SYSOUT, and an OTG device connected to the first port 108-1 operates according to OTG to receive power from the system output port SYSOUT. In case 7, an OTG device connected to the first port 108-1 operates according to OTG to receive power from the system output port SYSOUT. In case 8, an OTG device connected to the second port 108-2 operates according to OTG to receive power from the system output port SYSOUT. In case 9, both the first OTG device connected to the first port 108-1 and the second OTG device connected to the second adapter port 108-2 operate according to OTG to receive power from the system output port SYSOUT.

Figure 3:
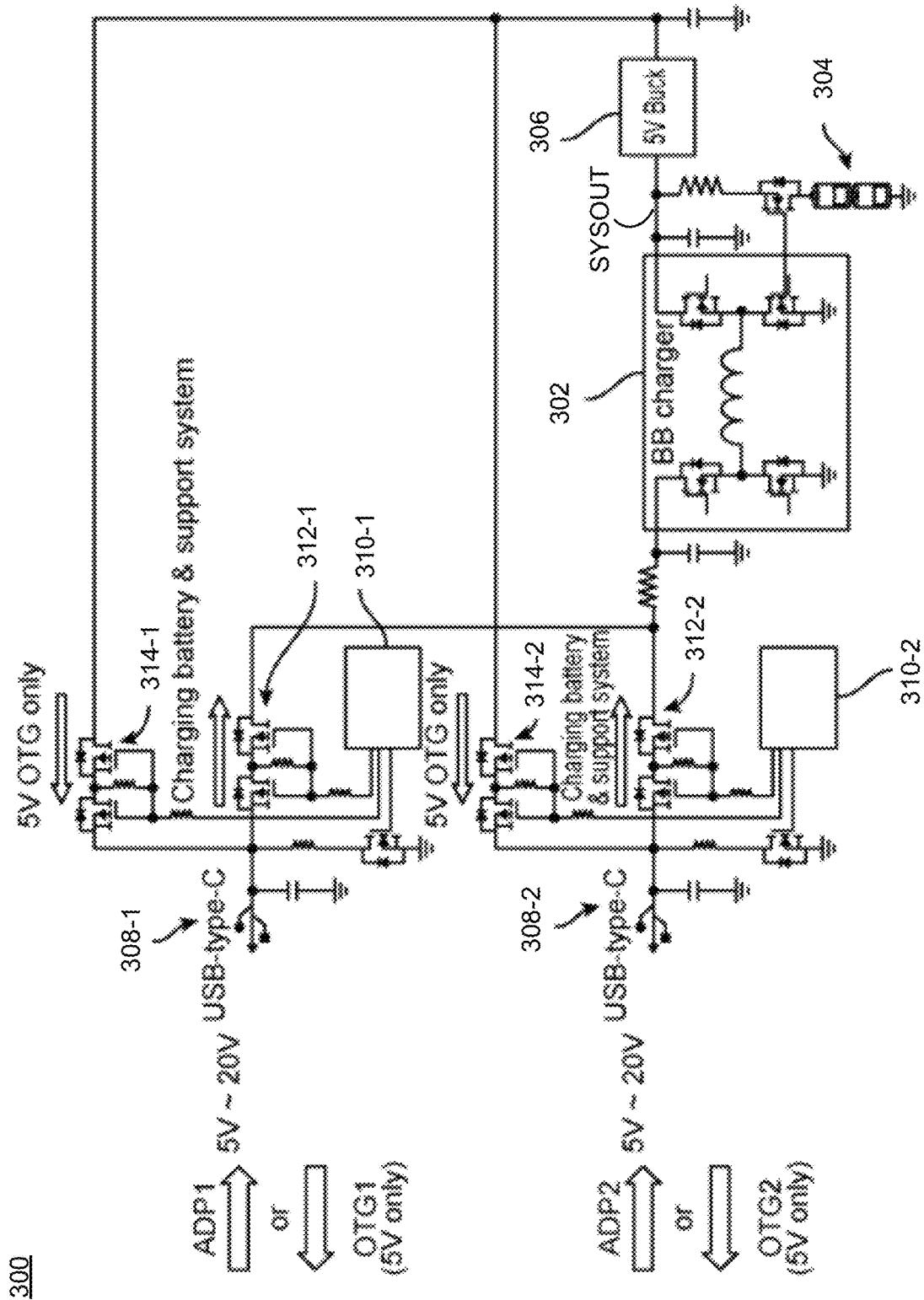
FIG. 3 is a block diagram illustrating one solution for a dual USB-Type-C ports application.

FIG. 3 is a block diagram illustrating problems in one example system 300 for a dual USB-Type-C ports application. In this example, a single buck-boost (BB) charger 302 supports system power and charges a battery 304. On-The-Go (OTG) power to devices connected to ports 308-1 and 308-2 may be provided through a single buck converter 306 and may be limited to 5V. Each port 308 may be coupled to a PD-IC 310 which controls two pairs of transistors 312 and 314. PD-IC 310 controls the transistor 314 so as to couple the OTG voltage (from the battery 304 via buck converter 306) to the adapter port 308 when an adapter is not connected and instead a power consuming device is connected. When an adapter is connected to port, PD-IC 310 controls the transistor 312 so as to couple the adapter voltage to the BB charger 302 for providing power at the system output port SYSOUT and/or charging battery 304. An embedded controller (EC, not shown) may communicate with PD-ICs 310-1 and 310-2 to ensure that one adapter is selected to be coupled to BB 302 for supplying power when adapters are plugged into both adapter ports 308-1 and 308-2 simultaneously. Among other things, this approach may employ complicated logic circuitry, thereby increasing the cost of implementation. Moreover, this approach may not support power add-up functionality for multiple adapters connected to ports 308. The present Applicant recognizes that such power add-up functionality could enable a Quick Charge function of the battery 304, or could support a CPU turbo event of a device (e.g., processor) coupled to the system output port SYSOUT, or both. Such functionality could build on and/or leverage the capabilities of example approaches described in US Patent Publication No. 2017/0279284), U.S. patent application Ser. No. 16/725,145 filed Dec. 23, 2019 and/or U.S. patent application Ser. No. 16/846,152 filed Apr. 10, 1920, the contents of all such applications being incorporated herein by reference in their entirety.

Figure 4:
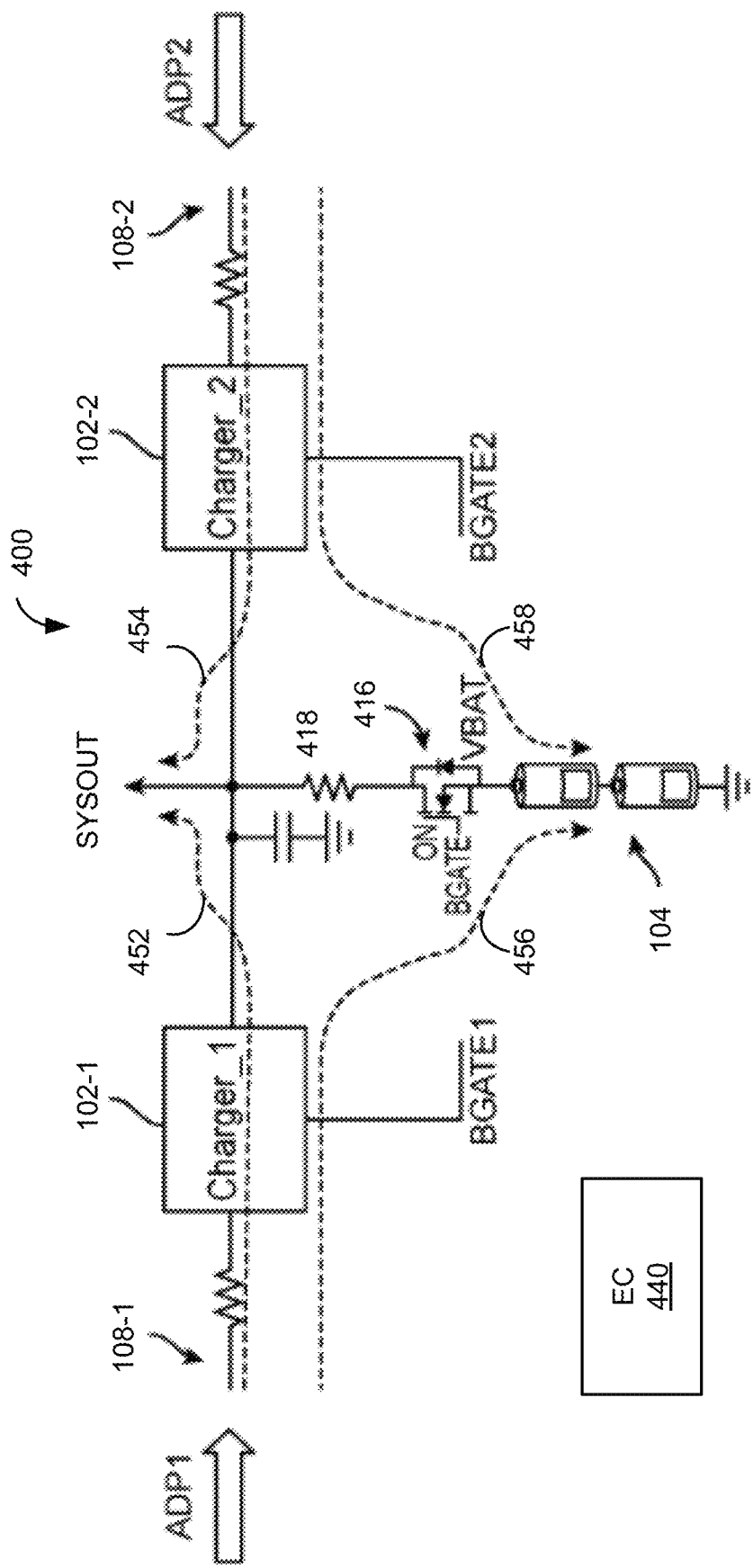
FIG. 4 is a block diagram of a system performing power add-up feature, according to some embodiments.

FIG. 4 is a block diagram of a system 400 including an adapter power add-up feature or function according to some embodiments. The system 400 may be implemented as the system 100. In some embodiments, the system 400 includes chargers 102-1, 102-2, a battery 104, a battery control transistor 416, a sense resistor 418, and EC 440. These components may operate together to store and exchange power among multiple devices. For example, two adapters connected to the adapter ports 108-1, 108-2 supply power through the chargers 102-1, 102-2 to a device (e.g., processor) connected to the system output port SYSOUT through paths 452, 454. Additionally or alternatively, two adapters connected to the adapter ports 108-1, 108-2 supply power through the chargers 102-1, 102-2 to charge the battery 104 through paths 456, 458. In some cases, the battery 104 provides additional power to the device (e.g., processor) connected to the system output port SYSOUT. In some embodiments, the system 400 includes more, fewer, or different components than shown in FIG. 4.

In one configuration, the charger 102-1 is coupled between the adapter port 108-1 and the system output port SYSOUT, and the charger 102-2 is coupled between the adapter port 108-2 and the system output port SYSOUT. The chargers 102-1, 102-2 may be or include DC-DC power converters capable of operating in buck, boost, or buck-boost mode. In one configuration, the sense resistors 418, the battery control transistor 416, and the battery 104 are coupled to the system output port SYSOUT in series. The battery control transistor 416 may be any transistor (e.g., MOSFET). In one configuration, the EC 440 is coupled to the chargers 102-1, 102-2. The EC 440 may be embodied as a digital logic circuit or a microcontroller with corresponding software and firmware, similarly to EC 140 of FIG. 1. However, the EC 440 may further configure or cause the chargers 102-1, 102-2 to provide power to the system output port SYSOUT and/or battery 104 using power add-up control functionality that will become more apparent from the foregoing example descriptions. Accordingly, two or more adapters connected to the adapter ports 108-1, 108-2 can provide combined power to the battery and/or a device connected to the system output port SYSOUT in a simple architecture.

In one aspect, configuring two or more chargers 102 of the system 400 to implement an adapter power add-up feature can be challenging. In particular, multiple current paths are connected to the system output port SYSOUT, where a single sense resistor 418 is implemented to sense a current through the battery 104. However, controlling two or more chargers 102 to provide power to the system output by sensing a current through the single sense resistor 418 may be difficult. Moreover, power demand from the device (e.g., processor) connected to the system output port SYSOUT may be unknown or may change frequently, thereby increasing complexity in configuring or controlling the chargers 102.

In one aspect, the EC 440 may configure or cause the chargers 102-1, 102-2 to provide power to the system output port SYSOUT according to a voltage at the system output port SYSOUT, a current through the sense resistor 418, or both. In one example, the EC 440 determines or sets parameters such as threshold values or target values of a voltage at the system output port SYSOUT, a current through the sense resistor 418, a current through an input adapter port, or a combination of them. According to the parameters set by the EC 440, the chargers 102-1, 102-2 can operate as voltage sources, current sources, or a combination of them. The chargers 102-1, 102-2 may automatically or autonomously change operating modes, for example, through a predetermined sequence, to satisfy the power demand at the system output port SYSOUT. The battery 104 may also discharge power to supply power to the system output port SYSOUT. In one approach, the EC 440 enables one charger 102-1 to generate a signal BGATE1 to control the battery control transistor 416, and disables the other charger 102-2 from controlling the battery control transistor 416. The chargers 102-1, 102-2 may set or change operating modes according to which charger has a BGATE control. Hence, the system 400 may perform a power add-up feature or function, without receiving any information indicating power demand from the device (e.g., processor) connected to the system output port SYSOUT. Detailed descriptions on example operations of the system 400 are provided below with respect to FIGS. 5 through 13.

Figure 5:
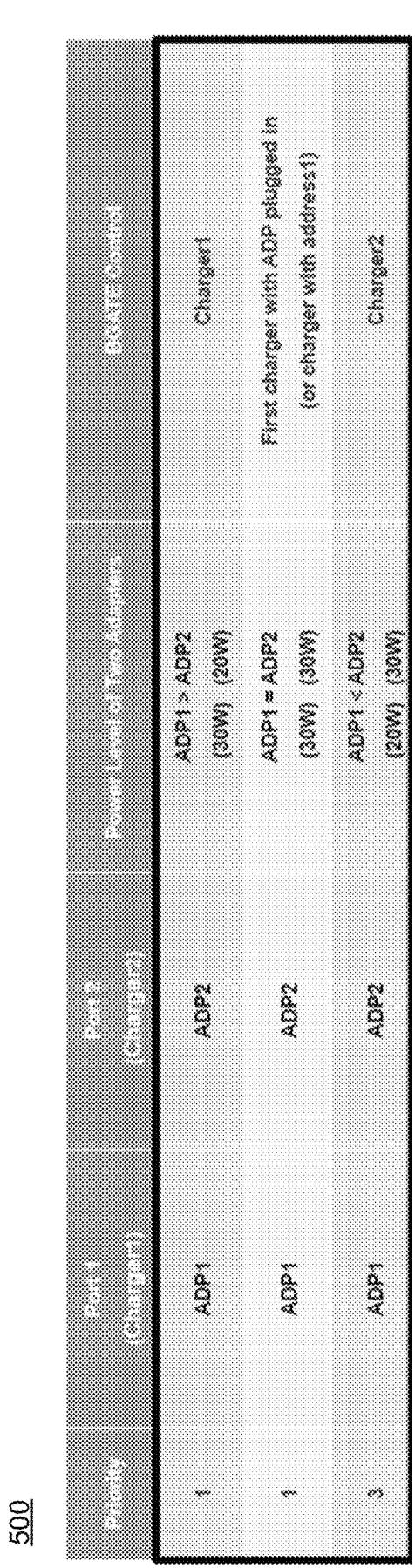
FIG. 5 is a table illustrating how to determine BGATE control priority, according to some embodiments.

FIG. 5 is a table 500 illustrating BGATE control priority for the system 400 according to embodiments. In one aspect, the EC 440 determines, from multiple chargers 102-1, 102-2, a charger 102 to control the battery control transistor 416. The EC 440 may receive information indicating available power of the adapters connected to the adapter ports 108-1, 108-2. The determined charger 102 may generate a control signal BGATE and provide the control signal BGATE to the gate electrode of the battery control transistor 416. In one example, the EC 440 may determine the charger 102-1 to control the battery control transistor 416, in response to available power of a first adapter connected to the adapter port 108-1 being larger than available power of a second adapter connected to the adapter port 108-2. In one example, the EC 440 may determine the charger 102-2 to control the battery control transistor 416, in response to available power of the second adapter connected to the adapter port 108-2 being larger than available power of the first adapter connected to the adapter port 108-1. In one example, if available power of the first adapter connected to the adapter port 108-1 is equal to available power of the second adapter connected to the adapter port 108-2, the EC 440 may determine the charger 102-1 to control the battery control transistor 416, in response to the first adapter being connected to the adapter port 108-1 before the second adapter being connected to the adapter port 108-2. By determining BGATE control priority for controlling the battery control transistor 416, a single charger 102 can control the battery control transistor 416 for managing battery power.

Figure 6:
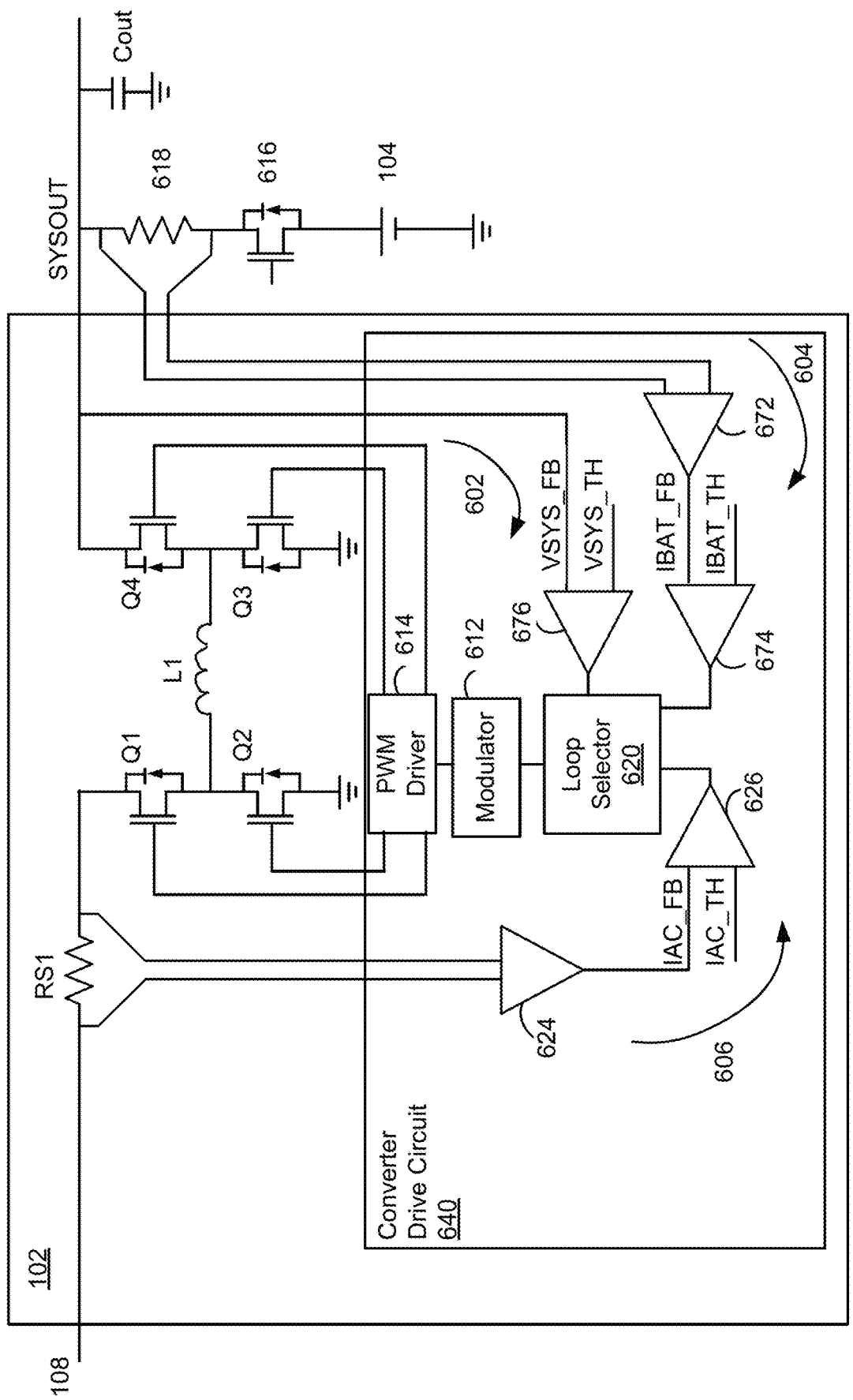
FIG. 6 is a block diagram illustrating one implementation of a charger, according to some embodiments.

FIG. 6 is a block diagram illustrating one implementation of a charger 102, according to some embodiments. In some embodiments, the charger 102 includes transistors Q1, Q2, Q3, Q4, an inductor L1, a resistor RS1, and a converter drive circuit 640. The transistors Q1, Q2, Q3, Q4 may be embodied as any transistors (e.g., MOSFETs). The converter drive circuit 640 may be embodied as a logic circuit. These components may operate together to perform DC-DC power conversion. In other embodiments, the charger 102 includes more, fewer, or different components than shown in FIG. 6.

In one configuration, the resistor RS1 is coupled between the adapter port 108 and a drain electrode of the transistor Q1. In one configuration, a source electrode of the transistor Q1 is coupled to a drain electrode of the transistor Q2, and a source electrode of the transistor Q2 is coupled to a ground voltage rail supplying a ground voltage. In one configuration, a drain electrode of the transistor Q4 is coupled to the system output port SYSOUT, a source electrode of the transistor Q4 is coupled to a drain electrode of the transistor Q3, and a source electrode of the transistor Q3 is coupled to the ground voltage rail. In one configuration, the inductor L1 is coupled between the source electrode of the transistor Q1 and the source electrode of the transistor Q4. In one configuration, the converter drive circuit 640 is coupled to two electrodes of the resistor RS1, two electrodes of the sense resistor 618, the system output port SYSOUT, and the gate electrodes of the transistors Q1, Q2, Q3, Q4. In this configuration, the converter drive circuit 640 may configure the transistors Q1, Q2, Q3, Q4 in a buck mode, a boost mode, or a buck-boost mode to convert DC power from an adapter connected to port 108 into DC power at the system output port SYSOUT.

In one aspect, the charger 102 includes multiple selectable feedback loops: system voltage loop 602, charge current loop 604, and adapter current loop 606. The charger 102 may receive a signal or an instruction from the EC 440 indicating voltage or current threshold values and a BGATE priority control, and automatically select one of the system voltage loop 602, the charge current loop 604, and the adapter current loop 606, for example through a predetermined sequence, according to the received signal or instruction.

In one aspect, the system voltage loop 602 is employed to sense and regulate a voltage at the system output port SYSOUT. The system voltage loop 602 is formed through a comparator 676 that compares the voltage at the system output port SYSOUT with a threshold voltage VSYS_TH. According to the comparison by the comparator 676, the modulator 612 may adjust pulse widths of pulses to drive the transistors Q1, Q2, Q3, Q4. According to the adjusted pulse widths, the PWM driver 614 may generate and provide pulses to the switches Q1, Q2, Q3, Q4 to regulate the voltage at the system output port SYSOUT. The charger 102 operating according to the system voltage loop 602 may operate as a voltage source to supply power to the system output port SYSOUT.

In one example, the charge current loop 604 is employed to sense and regulate a current through the battery 104. The charge current loop 604 is formed through an amplifier 672 and a comparator 674. The amplifier 672 may determine, sense, or amplify a voltage across the sense resistor 618 corresponding to the current through the battery 104, and the comparator 674 may compare the determined voltage from the amplifier 672 with a voltage corresponding to a threshold current IBAT_TH. According to the comparison by the comparator 674, the modulator 612 may adjust pulse widths of pulses to drive the transistors Q1, Q2, Q3, Q4. According to the adjusted pulse widths, the PWM driver 614 may generate and provide pulses to the switches Q1, Q2, Q3, Q4 to regulate the current through the battery 104. The charger 102 operating according to the charge current loop 604 may operate as a current source to supply power to the system output port SYSOUT.

In one example, the adapter current loop 606 is employed to sense and regulate a current through the adapter port 108. The adapter current loop 606 is formed through an amplifier 624 and a comparator 626. The amplifier 624 may determine, sense, or amplify a voltage across the resistor RS1 corresponding to the current through the adapter port 108, and the comparator 626 may compare the determined voltage by the amplifier 624 with a voltage corresponding to a threshold current IAC_TH. According to the comparison by the comparator 626, the modulator 612 may adjust pulse widths of pulses to drive the transistors Q1, Q2, Q3, Q4. According to the adjusted pulse widths, the PWM driver 614 may generate and provide pulses to the switches Q1, Q2, Q3, Q4 to regulate the current through the battery 104. The charger 102 operating according to the adapter current loop 606 may operate as a current source to supply power to the system output port SYSOUT.

In one aspect, the loop selector 620 selects the feedback loop in a predetermined sequence to support a quick charge feature for charging the battery 104 and/or a CPU turbo feature of a device (e.g., processor) coupled to the system output port SYSOUT. Loops selectors 620 of different chargers may communicate each other directly or through the EC 440, to select operating modes or feedback loops. In one aspect, the loop selector 620 selects the system voltage loop 602 to regulate the voltage at the system output port SYSOUT. In response to determining that the voltage at the system output port SYSOUT falls below a threshold voltage VSYS_TH despite the system voltage loop 602 regulating the voltage at the system output port SYSOUT, the loop selector 620 may select the charge current loop 604 to regulate the current through the battery 104. When the charge current loop 604 regulates the current through the battery 104, additional charger 102 may provide power to the system output port SYSOUT, the battery 104, or both. In response to determining that the current through the battery 104 falls below a threshold current IBAT_TH despite the charge current loop 604 regulating the current through the battery 104, the loop selector 620 may select the adapter current loop 606 to regulate the current through the adapter port 108. When the adapter current loop 606 regulates the current through the adapter port 108, additional charger 102 may provide power to the system output port SYSOUT. Accordingly, adapter power add-up feature can be performed without specific information on the power demand from the device (e.g., processor) coupled to the system output port SYSOUT. In some embodiments, the EC 440 may select loops or operating modes of one or more chargers 102. In some embodiments, the EC 440 performs one or more functionalities of the loop selector 620 or the converter drive circuit 640 described herein.

Figure 7:
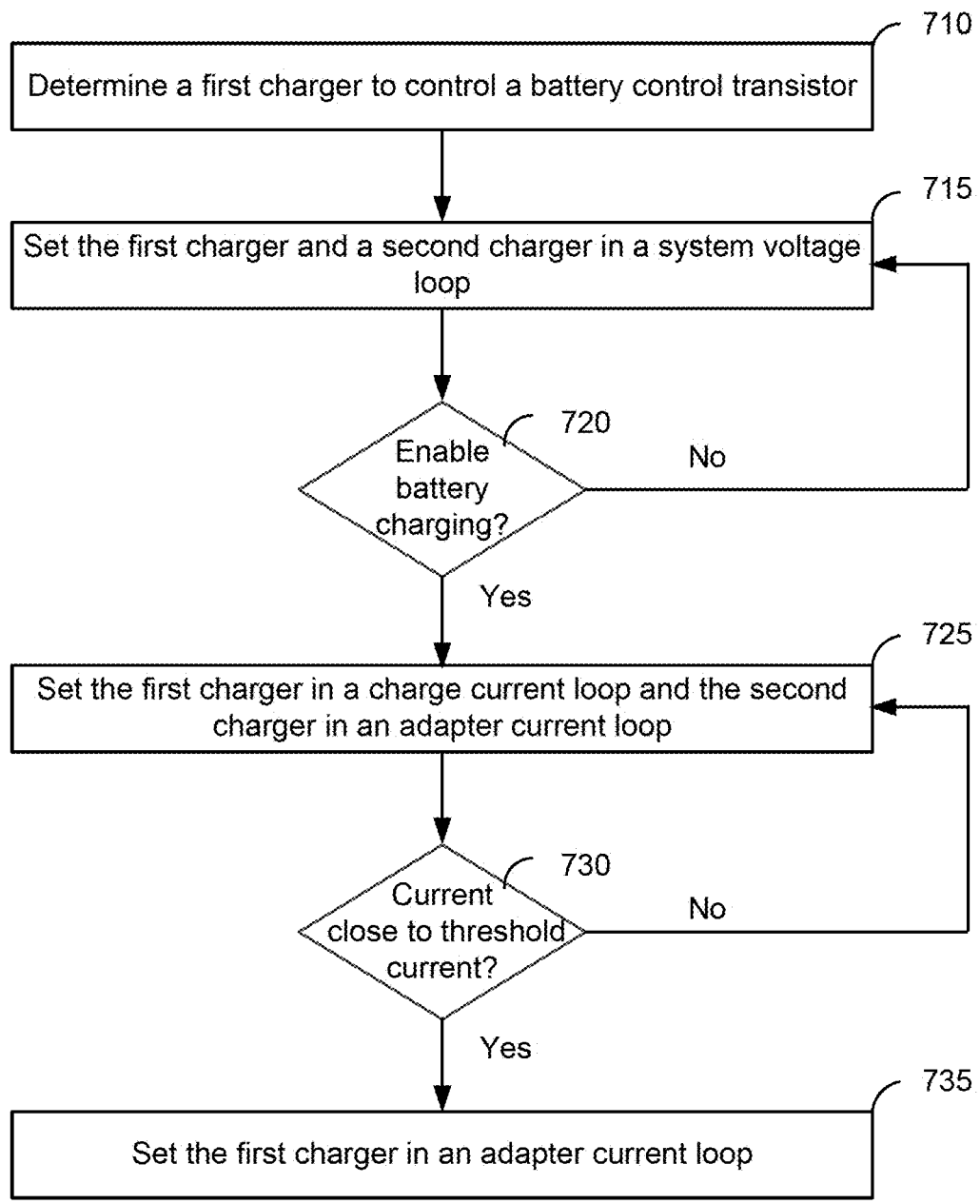
FIG. 7 is a flow chart illustrating a process of performing an adapter power add-up feature, according to some embodiments.

FIG. 7 is a flow chart illustrating a process 700 of performing an adapter power add-up feature, according to some embodiments. In some embodiments, the process 700 is performed by the system 400. In some embodiments, the process 700 is performed by other entities. In some embodiments, the process 700 includes more, fewer, or different steps than shown in FIG. 7.

In one approach, the system 400 determines 710 a first charger 102-1 to control a battery control transistor 416. The system 400 (e.g., EC 440) may receive information indicating available power from the adapters connected to the adapter ports 108-1, 108-2, and determine the first charger 102-1 to control the battery control transistor 416 according to the available power from the adapters. The determined charger 102-1 may generate a BGATE control signal and provide the BGATE control signal to the gate electrode of the battery control transistor 416. The BGATE control of the charger 102-2 may be configured in a tri-state, and the charger 102-2 may not control the battery control transistor 416. In one example, the system 400 (e.g., EC 440) may determine the charger 102-1 to control the battery control transistor 416, in response to available power of a first adapter connected to the adapter port 108-1 being larger than available power of a second adapter connected to the adapter port 108-2. In one example, the system 400 (e.g., EC 440) may determine the charger 102-2 to control the battery control transistor 416, in response to available power of the second adapter connected to the adapter port 108-2 being larger than available power of the first adapter connected to the adapter port 108-1. In one example, if available power of the first adapter connected to the adapter port 108-1 is equal to available power of the second adapter connected to the adapter port 108-2, the system 400 (e.g., EC 440) may determine the charger 102-1 to control the battery control transistor 416, in response to the first adapter being connected to the adapter port 108-1 before the second adapter being connected to the adapter port 108-2. By determining BGATE control priority for controlling the battery control transistor 416, a single charger 102 can control the battery control transistor 416 for providing power to the system output port SYSOUT.

In one approach, the system 400 sets 715 the first charger 102-1 and the second charger 102-2 in a system voltage loop 602, in response to determining the first charger 102-1 to control the battery control transistor 416. For example, the loop selector 620 of the first charger 102-1 selects the system voltage loop 602 of the first charger 102-1, and the loop selector 620 of the second charger 102-2 selects the system voltage loop 602 of the second charger 102-2. The EC 440 may set or configure the first charger 102-1 to have a higher threshold voltage VSYS_TH than the second charger 102-2. The first charger 102-1 operating according to the system voltage loop 602 with a higher first threshold voltage VSYS_TH may operate as a voltage source. The first charger 102-1 may disable the battery control transistor 416, and regulate the voltage at the system output port SYSOUT to be a first threshold voltage VSYS_TH of the first charger 102-1. The system 400 may set the second threshold voltage VSYS_TH of the second charger 102-2 to be higher than the minimum battery voltage but less than the first threshold voltage VSYS_TH of the first charger 102-1, such that the second charger 102-2 may be on standby to regulate the voltage at the supply output port SYSOUT to be the second threshold voltage VSYS_TH of the second charger 102-2. The first charger 102-1 may determine 720 whether battery charging is enabled or not. If there is no request, from the EC 440 or an external computing device, to enable the battery charging, the system 400 may maintain 715 the first charger 102-1 and the second charger 102-2 to operate in the system voltage loop 602.

In one approach, if there is a request to enable the battery charging, the system 400 may set 725 the first charger 102-1 in a charge current loop 604 and the second charger 102-2 in an adapter current loop 606. For example, the loop selector 620 of the first charger 102-1 selects the charger current loop 604 of the first charger 102-1, and the loop selector 620 of the second charger 102-2 selects the adapter current loop 606 of the second charger 102-2. The voltage at the system output port SYSOUT may decrease to a voltage of the battery 104, since the battery control transistor 416 is on when the first charger 102-1 operates in the charge current loop 604. The first charger 102-1 operating according to the charge current loop 604 may operate as a current supplier. The first charger 102-1 operating according to the charge current loop 604 may enable the battery control transistor 416, and regulate the current through the battery 104 to be a first threshold current IBAT_TH of the first charger 102-1. The second charger 102-2 operating according to the adapter current loop 606 may operate as a current supplier. The second charger 102-2 operating according to the adapter current loop 606 may regulate the current through the adapter port 108-2 to be the threshold current IAC_TH of the second charger 102-2. The first charger 102-1 operating according to the charge current loop 604 may monitor the current through the adapter port 108-1, and determine 730 whether the current through the adapter port 108-1 is within a predetermined range from a first threshold current IAC_TH of the first charger 102-1. If the current through the adapter port 108-1 is not within the predetermined range (e.g., ±5%) from the first threshold current IAC_TH, the system 400 may maintain 725 the first charger 102-1 to operate in the charge current loop 604.

In one approach, if the current through the adapter port 108-1 is within the predetermined range (e.g., ±5%) from the first threshold current IAC_TH, the system 400 may set 735 the first charger 102-1 in an adapter current loop 606 while the second charger 102-2 remains in the adapter current loop 606. For example, the loop selector 620 of the first charger 102-1 selects the adapter current loop 606 of the first charger 102-1, and the loop selector 620 of the second charger 102-2 selects the adapter current loop 606 of the second charger 102-2. In one aspect, the current through the battery 104 may decrease when the total power supplied by the first charger 102-1 and the second charger 102-2, both operating in the adapter current loop 606, is insufficient to support charging the battery 104 in a quick charge mode, power demand of the device (e.g., processor) connected to the system output port SYSOUT, for example, in a CPU turbo event, or both.

In one approach, if the power demand at the system output port SYSOUT is larger than the total adapter power supplied by the first charger 102-1 and the second charger 102-2, the battery 104 may discharge to supply power to the system output port SYSOUT to satisfy the demand while the system 400 maintains the first charger 102-1 and the second charger 102-2 to operate in the adapter current loop 606. In one aspect, the battery control transistor 416 may be turned on when the first charger 102-1 and the second charger 102-2 operate in the adapter current loop 606. Hence, when a device connected to the system output port SYSOUT draws current larger than current supplied by the first charger 102-1 and the second charger 102-2, the battery 104 may discharge to provide current or power to the device through the system output port SYSOUT.

Figure 8:
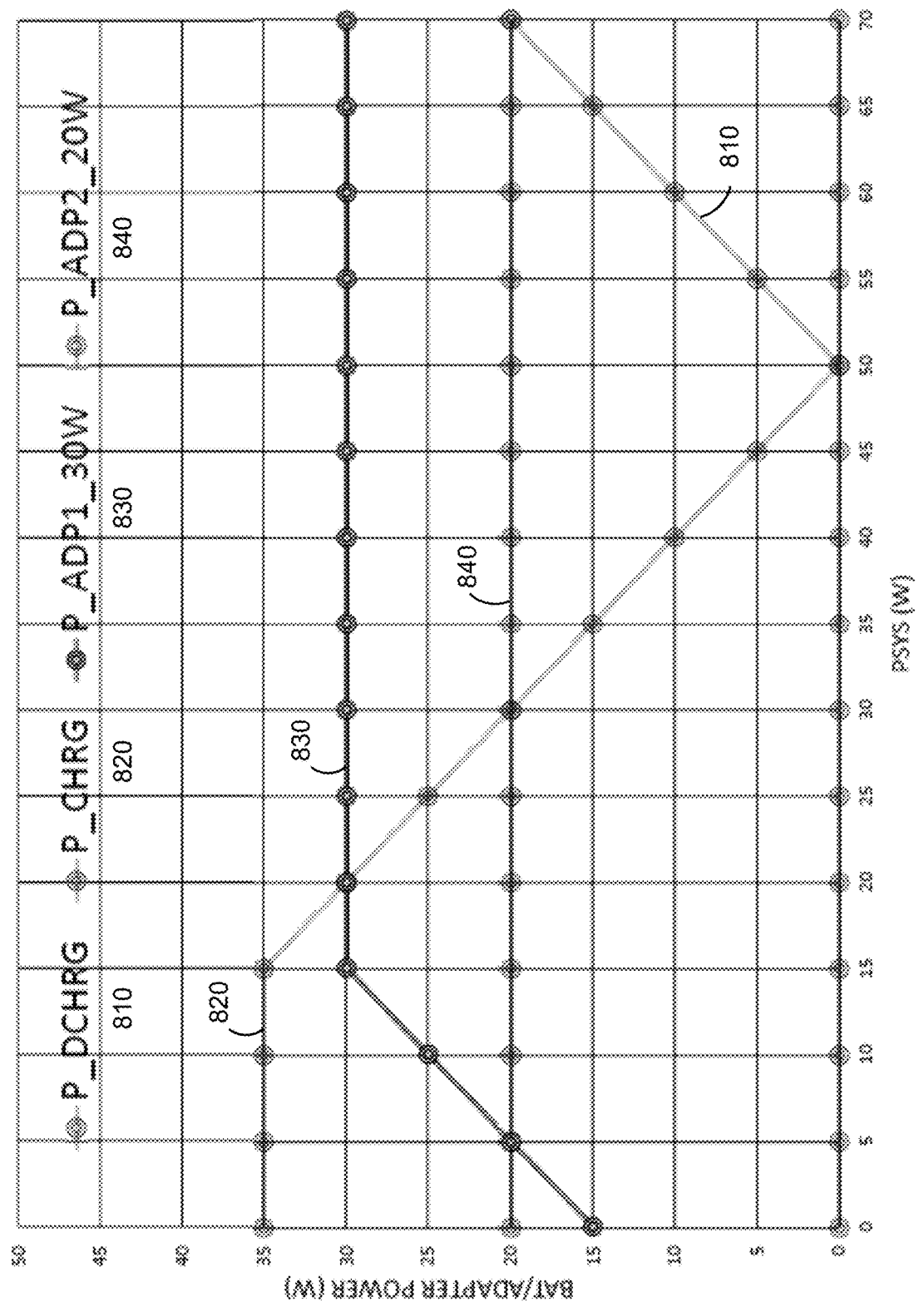
FIG. 8 is a graph illustrating power utilization, according to some embodiments.

FIG. 8 illustrates graphs 810, 820, 830, 840 of power utilization of the system 400 operating according to the process 700. In one example, the graph 810 corresponds to power discharged by the battery 104 to the system output port SYSOUT; the graph 820 corresponds to the power provided from the adapters to the battery 104 for charging; the graph 830 corresponds to power provided by the first charger 102-1 to the system output port SYSOUT, the battery 104, or both; and the graph 840 corresponds to power provided by the second charger 102-2 to the system output port SYSOUT, the battery 104, or both. In the example shown in FIG. 8, the first charger 102-1 has available power 30 W and the second charger 102-2 has available power 20 W, such that the first charger 102-1 and the second charger 102-2 may both provide power to the system output port SYSOUT and to support quick charging feature of the battery 104 that draws 35 W from the system output port SYSOUT. When the power demand from a device (e.g., processor) connected to the system output port SYSOUT is 0 W and the battery 104 is charged with 35 W for quick charging, the charger 102-1 may provide 15 W and the charger 102-2 may provide 20 W to charge the battery 104 at 35 W. As the power demand from the device (e.g., processor) connected to the system output port SYSOUT increases, the first charger 102-1 may increase power provided to the system output port SYSOUT to provide power to the device connected to the system output port SYSOUT. After the power output by the first charger 102-1 reaches its available output power (or 30 W), power provided to charge the battery 104 may be reduced as the power demand further increases. After the power provided to charge the battery 104 reaches 0 W, the battery 104 may discharge power to the system output port SYSOUT, for example, to support CPU turbo feature of the device (e.g., processor) connected to the system output port SYSOUT.

Figure 9:
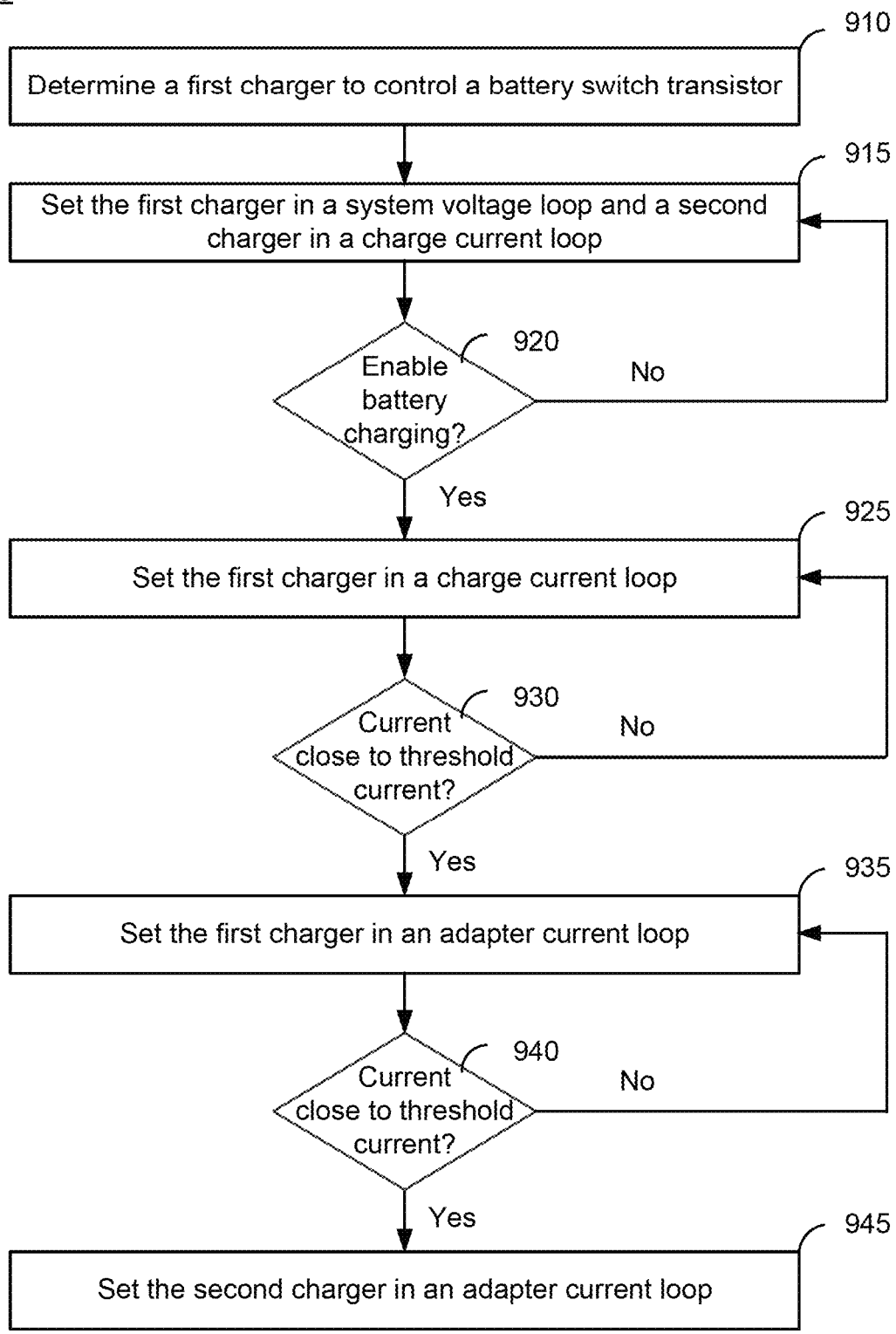
FIG. 9 is a flow chart illustrating a process of performing an adapter power add-up feature, according to some embodiments.

FIG. 9 is a flow chart illustrating a process 900 of performing an adapter power add-up feature, according to some embodiments. In some embodiments, the process 900 is performed by the system 400. In some embodiments, the process 900 is performed by other entities. In some embodiments, the process 900 includes more, fewer, or different steps than shown in FIG. 9.

In one approach, the system 400 determines 910 a first charger 102-1 to control a battery control transistor 416. The system 400 (e.g., EC 440) may receive information indicating available power from the adapters connected to the adapter ports 108-1, 108-2, and determine the first charger 102-1 to control the battery control transistor 416 according to the available power from the adapters. The determined charger 102-1 may generate a BGATE control signal and provide the BGATE control signal to the gate electrode of the battery control transistor 416. The BGATE control of the charger 102-2 may be configured in a tri-state, and the charger 102-2 may not control the battery control transistor 416. In one example, the system 400 may determine the charger 102-1 to control the battery control transistor 416, in response to available power of a first adapter connected to the adapter port 108-1 being larger than available power of a second adapter connected to the adapter port 108-2. In one example, the system 400 may determine the charger 102-2 to control the battery control transistor 416, in response to available power of the second adapter connected to the adapter port 108-2 being larger than available power of the first adapter connected to the adapter port 108-1. In one example, if available power of the first adapter connected to the adapter port 108-1 is equal to available power of the second adapter connected to the adapter port 108-2, the system 400 may determine the charger 102-1 to control the battery control transistor 416, in response to the first adapter being connected to the adapter port 108-1 before the second adapter being connected to the adapter port 108-2. By determining BGATE control priority for controlling the battery control transistor 416, a single charger 102 can control the battery control transistor 416 for managing battery power.

In one approach, the system 400 sets 915 the first charger 102-1 in a system voltage loop 602 and the second charger 102-2 in a charge current loop 604, in response to determining the first charger 102-1 to control the battery control transistor 416. For example, the loop selector 620 of the first charger 102-1 selects the system voltage loop 602, and the loop selector 620 of the second charger 102-2 selects the charge current loop 604. The first charger 102-1 operating according to the system voltage loop 602 may operate as a voltage source. The first charger 102-1 may disable the battery control transistor 416, and regulate the voltage at the system output port SYSOUT to be a first threshold voltage VSYS_TH of the first charger 102-1. The EC 440 may set the second threshold current IBAT_TH of the second charger 102-2 to be less than the desired charger current target that may later be set as the first threshold current IBAT_TH of the first charger 102-1, such that the second charger 102-2 may be on standby to regulate the charge current to be the second threshold current IBAT_TH of the second charger 102-2. The first charger 102-1 may determine 920 whether battery charging is enabled or not. If there is no request, for example from the EC 440 or an external computing device, to enable the battery charging, the system 400 may maintain 915 the first charger 102-1 to operate in the system voltage loop 602 and the second charger 102-2 to operate in the charge current loop 604.

In one approach, if there is a request to enable the battery charging, the system 400 may set 925 the first charger 102-1 in a charge current loop 604. For example, the loop selector 620 of the first charger 102-1 selects the charge current loop 604, and the loop selector of the second charger 102-2 selects the charge current loop 604. The voltage at the system output port SYSOUT may decrease to battery voltage since the battery control transistor 416 is on when the first charger 102-1 operates in the charge current loop 604. The first charger 102-1 operating according to the charge current loop 604 may operate as a current supplier. The first charger 102-1 may enable the battery control transistor 416, and regulate the current through the battery 104 to be a first threshold current IBAT_TH of the first charger 102-1. The first charger 102-1 may monitor the current through the adapter port 108-1 and determine 930 whether the current through the adapter port 108-1 is within a predetermined range (e.g., ±5%) from a first threshold current IAC_TH of the first charger 102-1. If the current through the adapter port 108-1 is not within the predetermined range (e.g., ±5%) from the first threshold current IAC_TH, the system 400 may maintain 925 the first charger 102-1 to operate in the charge current loop 604. The second charger 102-2 operating according to the charge current loop 604 may be on standby to regulate the charge current to be the second threshold current IBAT_TH of the second charger 102-2.

In one approach, if the current through the adapter port 108-1 is within the predetermined range (e.g., ±5%) from the first threshold current IAC_TH, the system 400 may set 935 the first charger 102-1 in an adapter current loop 606 while the second charger 102-2 remains in the charge current loop 604. For example, the loop selector 620 of the first charger 102-1 selects the adapter current loop 606, and the loop selector of the second charger 102-2 selects the charge current loop 604. The current through the battery 104 may decrease when the second charger 102-2 regulates the charge current to be the second threshold current IBAT_TH of the second charger 102-2. The system 400 may monitor the current through the battery 104, and determines 940 whether the current through the adapter port 108-2 is within a predetermined range (e.g., ±5%) from the second threshold current IAC_TH of the second charger 102-2. If the current through the adapter port 108-2 is not within the predetermined range (e.g., ±5%) from the second threshold current IAC_TH, the system 400 may maintain 935 the first charger 102-1 to operate in the adapter current loop 606 while the second charger 102-2 operates in the charge current loop 604.

In one approach, if the current through the adapter port 108-2 is within the predetermined range (e.g., ±5%) from the second threshold current IAC_TH, the system 400 may set 945 the second charger 102-2 in an adapter current loop 606 while the first charger 102-1 operates in the adapter current loop 606. For example, the loop selector 620 of the first charger 102-1 selects the adapter current loop 606, and the loop selector of the second charger 102-2 selects the adapter current loop 606. The current through the battery 104 may decrease when the total power supplied by the first charger 102-1 and the second charger 102-2, both operating in the adapter current loop 606, is insufficient to support charging the battery 104 in a quick charge mode, power demand of the device (e.g., processor) connected to the system output port SYSOUT, for example, in a CPU turbo event, or both. The second charger 102-2 operating according to the adapter current loop 606 may operate as a current supplier. The second charger 102-2 may regulate the current through the adapter port 108-2 to be the threshold current IAC_TH of the second charger 102-2.

In one approach, if the power demand at the system output port SYSOUT is larger than the total adapter power supplied by the first charger 102-1 and the second charger 102-2, the battery 104 may discharge to supply power to the system output port SYSOUT to satisfy the demand while the system 400 maintains the first charger 102-1 and the second charger 102-2 to operate in the adapter current loop 606. In one aspect, the battery control transistor 416 may be turned on when the first charger 102-1 and the second charger 102-2 operate in the adapter current loop 606. Hence, when a device connected to the system output port SYSOUT draws current larger than current supplied by the first charger 102-1 and the second charger 102-2, the battery 104 may discharge to provide current to the device through the system output port SYSOUT to supplement.

Figure 10:
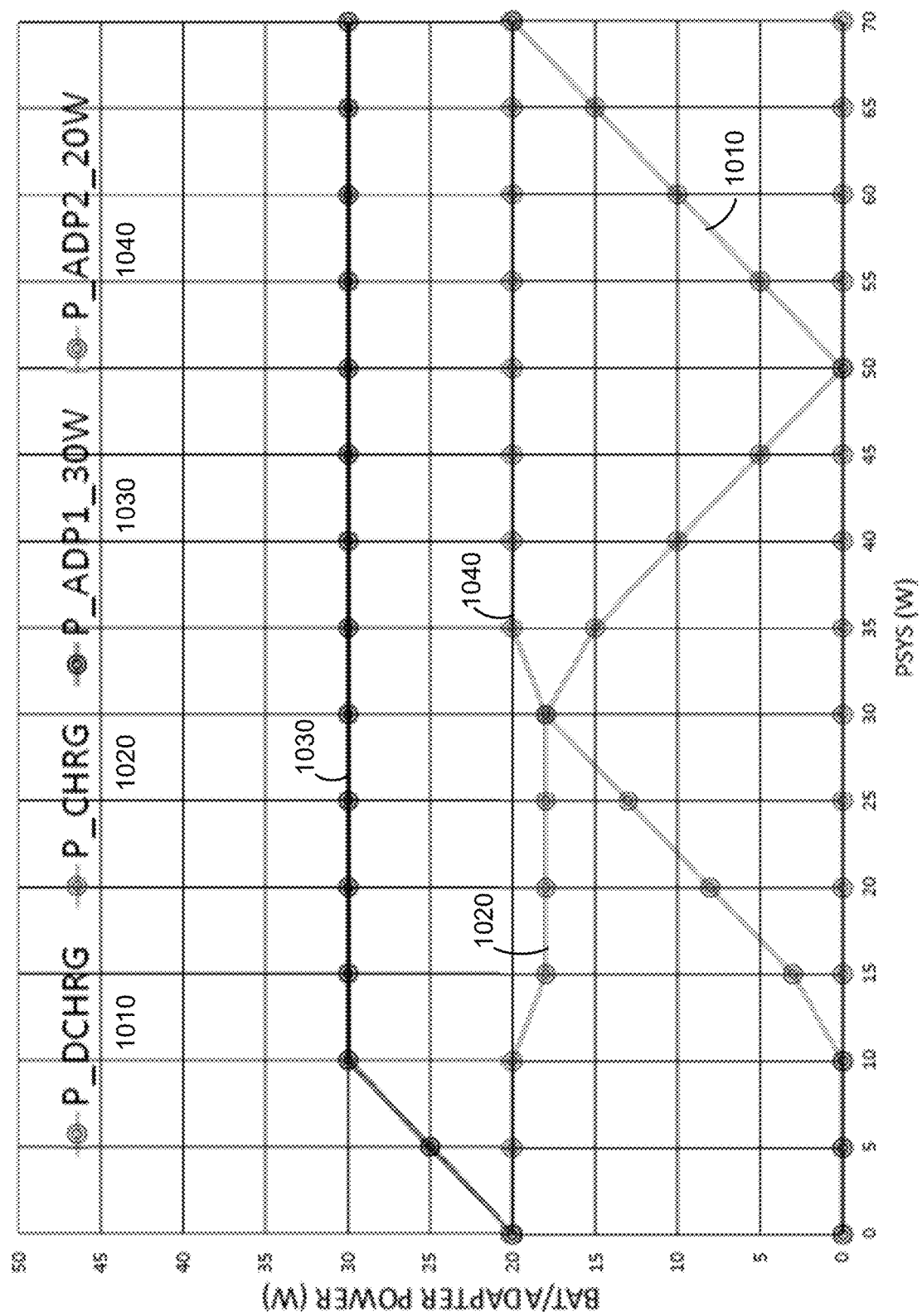
FIG. 10 is a graph illustrating power utilization, according to some embodiments.

FIG. 10 illustrates graphs 1010, 1020, 1030, 1040 of power utilization of the system 400 operating according to the process 900. In one example, the graph 1010 corresponds to power discharged by the battery 104 to the system output port SYSOUT; the graph 1020 corresponds to the power provided from the adapters to the battery 104 for charging; the graph 1030 corresponds to power provided by the first charger 102-1 to the system output port SYSOUT, the battery 104, or both; and the graph 1040 corresponds to power provided by the second charger 102-2 to the system output port SYSOUT, the battery 104, or both. In the example shown in FIG. 10, the first charger 102-1 has available power 30 W and the second charger 102-2 has available power 20 W. When the power demand from a device (e.g., processor) connected to the system output port SYSOUT is 0 W and the battery 104 is charged with 20 W for normal charging, the charger 102-1 may provide 20 W and the charger 102-2 may provide 0 W to charge the battery 104 at 20 W (e.g., normal charging). As the power demand from the device (e.g., processor) connected to the system output port SYSOUT increases, the first charger 102-1 may increase power provided to the system output port SYSOUT to provide power to the device connected to the system output port SYSOUT. After the power output by the first charger 102-1 reaches its available output power (or 30 W), the second charger 102-2 may increase power provided to the system output port SYSOUT and the battery 104 as the power demand further increases. After the power output by the second charger 102-2 reaches its available output power (or 20 W), power provided to charge the battery 104 may be reduced as the power demand further increases. After the power provided to charge the battery 104 reaches 0 W, the battery 104 may discharge power to the system output port SYSOUT, for example, to support CPU turbo feature of the device (e.g., processor) connected to the system output port SYSOUT.

Figure 11:
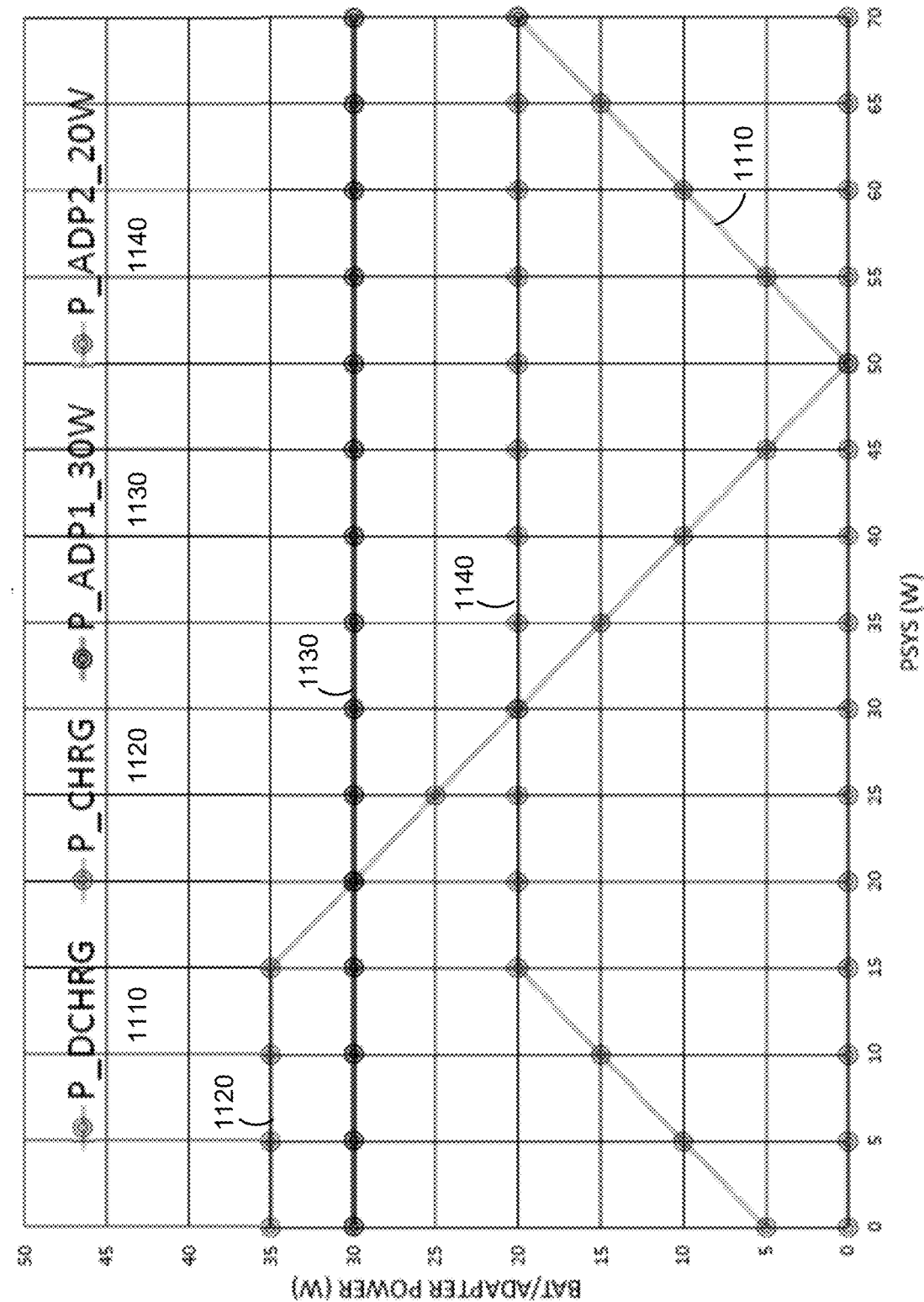
FIG. 11 is a graph illustrating power utilization, according to some embodiments.

FIG. 11 illustrates graphs 1110, 1120, 1130, 1140 of power utilization of the system 400 operating according to the process 700. In one example, the graph 1110 corresponds to power discharged by the battery 104 to the system output port SYSOUT; the graph 1120 corresponds to the power provided from the adapters to the battery 104 for charging; the graph 1130 corresponds to power provided by the first charger 102-1 to the system output port SYSOUT, the battery 104, or both; and the graph 1140 corresponds to power provided by the second charger 102-2 to the system output port SYSOUT, the battery 104, or both. In the example shown in FIG. 11, the first charger 102-1 has available power 30 W and the second charger 102-2 has available power 20 W. When the power demand from a device (e.g., processor) connected to the system output port SYSOUT is 0 W and the battery 104 is charged with 35 W for quick charging, the first charger 102-1 may provide 30 W and the second charger 102-2 may provide 5 W to charge the battery 104 at 35 W (e.g., quick charging). As the power demand from the device (e.g., processor) connected to the system output port SYSOUT increases, the second charger 102-2 may increase power provided to the system output port SYSOUT to provide power to the device connected to the system output port SYSOUT. After the power output by the second charger 102-2 reaches its available output power (or 20 W), power provided to charge the battery 104 may be reduced as the power demand further increases. After the power provided to charge the battery 104 reaches 0 W, the battery 104 may discharge power to the system output port SYSOUT, for example, to support CPU turbo feature of the device (e.g., processor) connected to the system output port SYSOUT.

FIG. 12 is a table 1200 showing example operating conditions of the system 400 of FIG. 4, according to some embodiments. In one example, the implementation example 1 corresponds to the system 400 operating according to the process 700 for charging the battery 104 in a normal charging mode. In one example, the implementation example 1 corresponds to the system 400 operating according to the process 700 for charging the battery 104 in a quick charging mode. In one example, the implementation example 2 corresponds to the system 400 operating according to the process 900 for charging the battery 104 in the normal charging mode or the quick charging mode. In the implementation example 1 for normal charging, to support CPU turbo event, the charger 102-1 with the BGATE priority, the battery 104, and the charger 102-2 may provide power in that sequence. In the implementation example 1 for quick charging, to support CPU turbo event, the charger 102-1 and the charger 102-2 may provide power to the system output port SYSOUT. The battery 104 may discharge and provide power to the system output SYSOUT, if the charger 102-1 and the charger 102-2 are insufficient to satisfy the power demand. In the implementation example 2, to support CPU turbo event by the charger 102-1, the charger 102-1 with the BGATE priority, the charger 102-2, and the battery 104 may provide power in that sequence.

Figure 13:
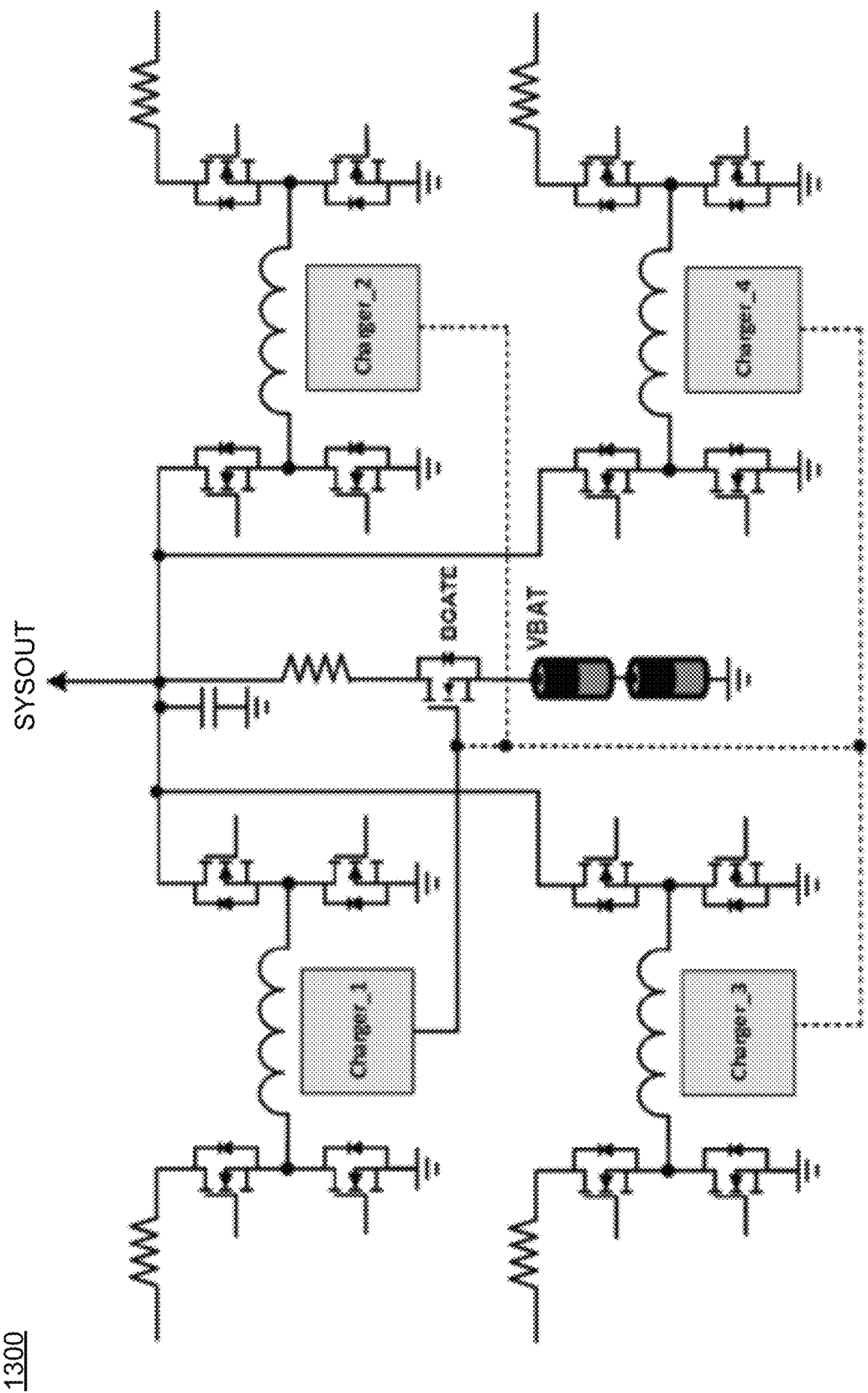
FIG. 13 is a block diagram of a system including an adapter power add-up feature according to some embodiments.

FIG. 13 is a block diagram of a system 1300 including an adapter power add-up feature according to some embodiments. The system 1300 may be implemented as the system 100. In one aspect, the system 1300 is similar to the system 400 except the system 1300 includes four chargers. The principled disclosed with respect to the system 400 for various power add-up features can be applied to the system 1300 having four or any number of chargers.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A system comprising:
a first charger coupled between a first adapter port and a system output port, the first charger including two or more feedback loops;
a second charger coupled between a second adapter port and the system output port, the second charger including two or more feedback loops;
a battery control transistor and a battery coupled to the system output port in series; and
a controller coupled to the first charger and the second charger, the controller configured to select, from the first charger and the second charger, the first charger to control the battery control transistor,
wherein a first feedback loop from the two or more feedback loops of the first charger and a second feedback loop from the two or more feedback loops of the second charger are selected, according to selecting the first charger to control the battery control transistor.

2. The system of claim 1, wherein the first charger is configured to select the first feedback loop of the first charger and the second charger is configured to select the second feedback loop of the second charger, without information on power demand from a device coupled to the system output port.

3. The system of claim 1,
wherein the first charger is configured to select the first feedback loop of the two or more feedback loops of the first charger in response to selecting the first charger to control the battery control transistor, and
wherein the second charger is configured to select the second feedback loop of the two or more feedback loops of the second charger, in response to selecting the first charger to control the battery control transistor.

4. The system of claim 1, wherein the controller is configured to:
set a maximum voltage controlled by the second charger to be less than a maximum voltage controlled by the first charger, in response to determining the first charger to control the battery control transistor.

5. The system of claim 1, wherein the controller is configured to determine, from the first charger and the second charger, the first charger to control the battery control transistor, in response to a first available power of the first charger being larger than a second available power of the second available power.

6. The system of claim 1, wherein the controller is configured to determine, from the first charger and the second charger, the first charger to control the battery control transistor, in response to a first device being connected to the first adapter port before a second device being connected to the second adapter port.

7. The system of claim 1, wherein the first charger is configured to select a first system voltage loop of the first charger regulating a voltage at the system output port, in response to determining the first charger to control the battery control transistor.

8. The system of claim 7, wherein the second charger is configured to select a second system voltage loop of the second charger regulating the voltage at the system output port, in response to determining the first charger to control the battery control transistor.

9. The system of claim 8, wherein the first charger is configured to select a charge current loop of the first charger regulating a current through the battery control transistor and the second charger is configured to select a first adapter current loop of the second charger regulating an input current through the second adapter port, in response to determining that charging the battery is enabled.

10. The system of claim 9, wherein the first charger is configured to select a second adapter current loop of the first charger, in response to an input current through the first adapter port being within a predetermined range from a predetermined threshold.

11. The system of claim 7, wherein the second charger is configured to select a first charge current loop of the second charger regulating a current through the battery control transistor, in response to determining the first charger to control the battery control transistor.

12. The system of claim 11, wherein the first charger is configured to select a second charge current loop of the first charger regulating the current through the battery control transistor, in response to determining that charging the battery is enabled.

13. The system of claim 12, wherein the first charger is configured to select an adapter current loop of the first charger regulating an input current through the first adapter port, in response to the input current through the first adapter port being within a predetermined range from a predetermined threshold.

14. The system of claim 1, further comprising:
a sense resistor coupled to system output port in series with the battery control transistor and the battery,
wherein the first charger is configured to determine a current through the battery control transistor, according to a voltage difference across the sense resistor.

15. A method comprising:
detecting, by a first charger coupled between a first adapter port and a system output port, a voltage at the system output port or a current through a battery control transistor, the battery control transistor and a battery coupled to the system output port in series, a second charger coupled between a second adapter port and the system output port, the first charger including two or more feedback loops, the second charger including two or more feedback loops;

selecting, by a controller coupled to the first charger and the second charger, the first charger from the first charger and the second charger to control the battery control transistor;

selecting, by the first charger, a first feedback loop from the two or more feedback loops of the first charger, in response to selecting the first charger to control the battery control transistor;

selecting, by the second charger, a second feedback loop from the two or more feedback loops of the second charger, in response to selecting the first charger to control the battery control transistor; and configuring, by the controller, the first charger and the second charger to provide power to the system output port, according to the first feedback loop and the second feedback loop.

16. The method of claim 15, wherein the first feedback loop of the first charger and the second feedback loop of the second charger are selected to provide power to a device coupled to the system output port, without information on power demand from the device.

17. The method of claim 15, further comprising:
determining, by the controller, the first charger from the first charger and the second charger to control the battery control transistor, in response to a first available power of the first charger being larger than a second available power of the second available power.

18. The method of claim 15, further comprising:
determining, by the controller, the first charger from the first charger and the second charger to control the battery control transistor, in response to a first device being connected to the first adapter port before a second device being connected to the second adapter port.

19. The method of claim 15, wherein selecting, by the first charger, the first feedback loop includes:
selecting, by the first charger, a first system voltage loop of the first charger regulating the voltage at the system output port, in response to determining the first charger to control the battery control transistor.

20. The method of claim 19, wherein selecting, by the first charger, the first feedback loop includes:
selecting, by the first charger, a first charge current loop of the first charger regulating the current through the battery control transistor, in response to determining that charging the battery is enabled.

* * * * *